UNITED STATES PATENT OFFICE.

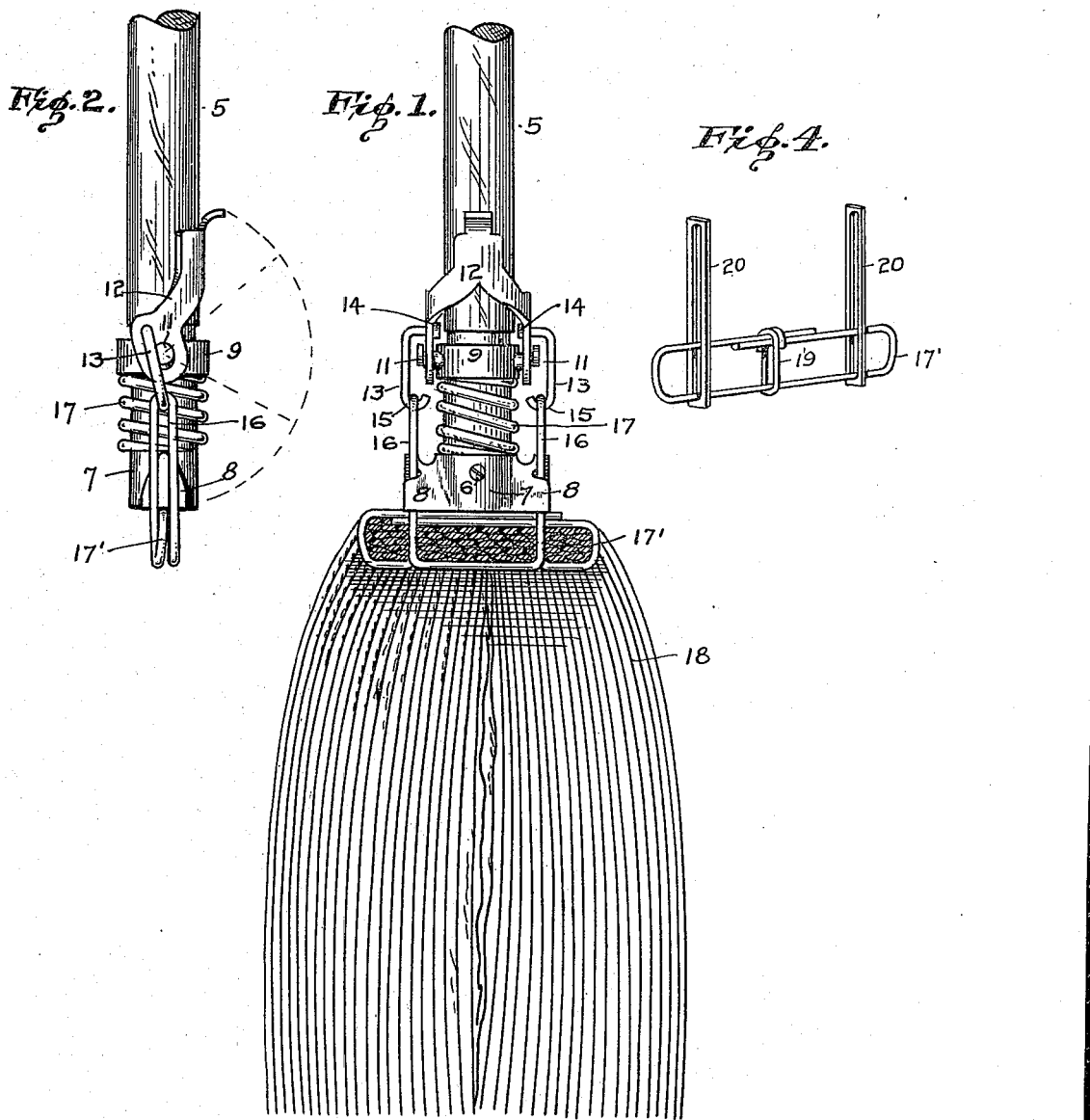
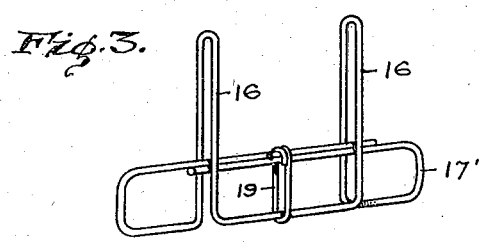

LEWIS A. McKAY, OF INDIANAPOLIS, INDIANA.

MOP.

1,194,048.  Specification of Letters Patent.  Patented Aug. 8, 1916.

Application filed February 25, 1916. Serial No. 80,382.

*To all whom it may concern:*

Be it known that I, LEWIS A. McKAY, a citizen of the United States, residing at Indianapolis, in the county of Marion and State of Indiana, have invented certain new and useful Improvements in Mops, of which the following is a specification.

The object of this invention is to provide a mop-handle and head which are removably secured to the mop thrums whereby the latter when worn too much for use may be easily removed and new ones substituted, thereby continuing the use of the handle and head which are the most expensive portions of the complete article.

I accomplish the objects of the invention by the means illustrated in the accompanying drawing, in which—

Figure 1 is a front elevation showing the mop thrums in cross section where they are attached to the bail, this view showing the parts in closed or operative position. Fig. 2 is a side elevation of the handle and head without the thrums. Fig. 3 is a perspective view of the wire bail for binding the thrums together and attaching them to the mop-head, and Fig. 4 is a perspective view of a modified form of the latter in which the head attaching loops are separate from the binding wire.

Like characters of reference indicate like parts throughout the several views of the drawing.

The handle 5, is preferably of wood, which, on account of the growing scarcity of timber, is becoming more expensive each year and may be saved for repeated use by the aid of my invention. Secured by a screw 6, to one end of this handle is a metal ferrule 7, having a pair of diametrically opposite lugs 8, 8, in the ends of which are a pair of parallel channels extending longitudinally with the handle, to receive the stems of thrum-holding loops. Loosely mounted on the handle near the ferrule is a ring 9, having a pair of diametrically opposite trunnions 11, 11, to which the bifurcated ends of a lever 12 are pivoted. The ends of the trunnions are offset from the body portions to form shoulders which, while passing freely through the eyes in the lever for insertion, prevent accidental removal. The one-piece body or handle end of the lever 12 contacts the handle 5 in the locked position as shown in the drawing. The bifurcated arms of the lever 12 have holes at one side of a line from the trunnions to the handle end of the lever and between the latter and said trunnions for the insertion of the ends of wire links 13, the inserted ends of which are expanded forming heads 14 to prevent withdrawal. These links are bent down at right angles and terminate with hooks 15, to engage the ends of loops 16. A spring 17 wrapped around the handle 5, between the ferrule 7 and ring 9, acts to separate the ring from the ferrule, thereby moving the lever 12 and attached links 13 with it.

The thrums 18 comprise a plurality of fibers, preferably cotton yarn, bound together at their middles with a wire bent to form an elongated substantially rectangular body 17', crossed by a pair of integrally formed and laterally extended parallel loops 16. The stems of the loops enter the channels, as previously stated, in the ends of the lugs 8, 8.

The bound thrums as here described are readily attached to and removed from the handle and the head on the latter, and may be sold separately at a great saving in cost over mops which are not capable of such separation as to enable the handle and head to be reused.

In the attachment and removal of the bound thrums the handle of the lever 12 is moved from the position shown in the drawing, to an opposite lower position which lowers the links 13 so as to enable their hooked ends to be readily inserted in or removed from the loops, as the case may be, and then, where the hooks have entered the loops, an upward throw of the lever to the position shown in the drawing will compress spring 17, thereby forcing the ferrule and its lugs against the tie 17'.

In the modification shown in Fig. 4, the loops 20, 20, are formed out of sheet metal and are slipped upon the elongated thrum-tie 17'. The latter is held from spreading by a wire tie 19. The loops 20 are used in the same manner as described for the loops 16.

Having thus fully described my invention, what I claim as new and wish to secure by Letters Patent of the United States, is—

1. The combination with a mop and a tie for said mop having a pair of loops, of a handle, a guide for the loops on the end of the handle, a bifurcated lever, hooks to engage the loops said hooks being carried by the lever, a ring sliding on the handle to which the lever is fulcrumed and a spring to press the ring away from the guide.

2. The combination of a mop, a tie for said mop comprising a wire bent around it in the form of an elongated body said body being crossed by a pair of integrally formed laterally extended parallel loops, a handle, and a head on the handle having an elastic lever-operated means for engaging said loops and for drawing the mop tightly against a portion of the head.

3. The combination of a mop, a tie for said mop comprising a wire bent around it in the form of an elongated loop, a pair of parallel loops extending across the first loop and laterally thereof, a handle, a guide for the loops on the end of the handle, a bifurcated lever, a ring sliding on the handle to which ring the lever is fulcrumed and a spring to press the ring away from the guide.

In witness whereof, I have hereunto set my hand and seal at Indianapolis, Indiana, this 19th day of February, A. D. one thousand nine hundred and sixteen.

LEWIS A. McKAY. [L. S.]

Copies of this patent may be obtained for five cents each, by addressing the "Commissioner of Patents, Washington, D. C."